United States Patent [19]
Yoshikawa

[11] Patent Number: 5,696,748
[45] Date of Patent: Dec. 9, 1997

[54] HOLOGRAM OPTICAL SYSTEM FOR OPTICAL PICKUP FOR OPTICAL DISK DRIVE

[75] Inventor: Hiroyasu Yoshikawa, Kawasaki, Japan

[73] Assignee: Fujitsu Limited, Kawasaki, Japan

[21] Appl. No.: 681,810

[22] Filed: Jul. 29, 1996

[30] Foreign Application Priority Data

Jan. 22, 1996 [JP] Japan ................... 8-008248

[51] Int. Cl.⁶ ................................................. G11B 7/135
[52] U.S. Cl. ....................... 369/103; 369/112; 369/44.12
[58] Field of Search ........................... 369/103, 112, 369/109, 44.11, 44.12, 44.14

[56] References Cited

U.S. PATENT DOCUMENTS

| | | | |
|---|---|---|---|
| 4,665,310 | 5/1987 | Heemskerk . | |
| 4,835,378 | 5/1989 | Coops . | |
| 4,908,506 | 5/1990 | Coops . | |
| 5,422,870 | 6/1995 | Kojima et al. | 369/112 X |
| 5,446,719 | 8/1995 | Yoshida et al. | 369/112 X |
| 5,581,523 | 12/1996 | Seki et al. | 369/112 X |

FOREIGN PATENT DOCUMENTS 61233441  10/1986  Japan .

*Primary Examiner*—Muhammad N. Edun
*Attorney, Agent, or Firm*—Greer, Burns, & Crain, Ltd.

[57] ABSTRACT

A hologram optical system includes a stem, a laser diode fixed to the stem, and a focusing error detector fixed to the stem. The focusing error detector is divided into a first region and a second region by at least one straight dividing line. The hologram optical system further includes a cap mounted on the stem so as to surround the laser diode and the focusing error detector, and a hologram mounted on the cap so as to make given positional relationship with the laser diode and the focusing error detector. When the dividing line of the focusing error detector has a positive gradient, the hologram has a distribution of interference fringes such that the product of a change rate of an X-directional component of the pitch of the interference fringes and a change rate of a Y-directional component of the pitch of the interference fringes is negative. In contrast, when the dividing line of the focusing error detector has a negative gradient, the hologram has a distribution of interference fringes such that the product of the change rate of the X-directional component and the change rate of the Y-directional component of the pitch is positive.

6 Claims, 17 Drawing Sheets

HOLOGRAM OPTICAL SYSTEM FOR OPTICAL PICKUP FOR OPTICAL DISK DRIVE

BACKGROUND OF THE INVENTION

1. Field of the Invention

The present invention relates to a hologram optical system for an optical pickup (optical head) for an optical disk drive.

2. Description of the Related Art

An optical disk is in the limelight as a memory medium which has become the core in the rapid development of multimedia in recent years. Usually, the optical disk is accommodated in a cartridge for actual use. An optical disk cartridge is loaded into an optical disk drive to read/write data on the optical disk by an optical pickup.

Conventionally proposed are some configurations using a hologram for the optical pickup for the optical disk drive. The hologram is integrated with a laser diode and a photodetector to perform error detection of a laser beam for servo control. The error detection of the laser beam is classified into focusing error detection for detecting an error of focusing of the beam on the optical disk and tracking error detection for detecting a shift of the beam from a given track of the optical disk.

A hologram for imaging a focusing error signal (FES) beam is located between a detector and a collimator lens. The FES beam is diffracted by the hologram, and is then introduced into the detector. In the case that a single hologram is located in an optical path of a laser beam, an angle of emergence of the laser beam from the hologram changes with variations in wavelength of the laser beam from the laser diode, causing a change in beam imaging position on the detector.

In the case of using a double knife edge method (Foucault method) well known as a servo detection method, the relation between a dividing line for dividing the photodetector into two regions and a beam imaging position on the photodetector is important, and the beam imaging position in relation to the dividing line must not be changed with wavelength variations. As a conventional method in which servo detection is not influenced by wavelength variations, it has been proposed that the direction of diffraction of the beam from the hologram is made parallel to the direction of the dividing line (Japanese Patent Laid-open Nos. Sho 62-97141, Hei 1-106341, Hei 2-172025, and Sho 61-233441).

There is a possibility that the FES beam imaging position may be shifted from the dividing line of the photodetector because of manufacture errors of optical elements in spite of the fact that the beam is focused on the optical disk. In a conventional optical pickup wherein a laser diode and a photodetector are not integrated with each other, the FES beam imaging position can be moved to lie on the dividing line by adjusting the position of the photodetector.

However, in a recent optical pickup, a laser diode and a photodetector are formed on a common stem, so as to realize a size reduction. Accordingly, the above conventional method of moving the FES beam imaging position to the dividing line by adjusting the position of the photodetector cannot be adopted, so that another adjusting method capable of absorbing manufacture errors of optical elements is required.

SUMMARY OF THE INVENTION

It is therefore an object of the present invention to provide a hologram optical system for an optical pickup for an optical disk drive which is suitably applied to an adjusting method capable of absorbing manufacture errors of optical elements.

In accordance with an aspect of the present invention, there is provided a hologram optical system for an optical pickup for an optical disk drive, comprising a stem; a laser diode fixed to the stem; a focusing error detector fixed to the stem and having at least one straight dividing line for dividing the focusing error detector into a first region and a second region; a cap mounted on the stem so as to surround the laser diode and the focusing error detector; and a hologram mounted on the cap so as to make given positional relationship with the laser diode and the focusing error detector; wherein the dividing line of the focusing error detector has a positive gradient, and the product of a change rate of an X-directional component of a pitch of interference fringes on the hologram and a change rate of a Y-directional component of the pitch is negative.

In accordance with another aspect of the present invention, there is provided a hologram optical system for an optical pickup for an optical disk drive, comprising a stem; a laser diode fixed to the stem; a focusing error detector fixed to the stem and having at least one straight dividing line for dividing the focusing error detector into a first region and a second region; a cap mounted on the stem so as to surround the laser diode and the focusing error detector; and a hologram mounted on the cap so as to make given positional relationship with the laser diode and the focusing error detector; wherein the dividing line of the focusing error detector has a negative gradient, and the product of a change rate of an X-directional component of a pitch of interference fringes on the hologram and a change rate of a Y-directional component of the pitch is positive.

Adjustment of the optical pickup in manufacturing the optical disk drive is performed by moving the hologram having the above characteristic distribution of interference fringes. That is, the hologram in the hologram optical system of the present invention has a distribution of interference fringes fit for this adjustment.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
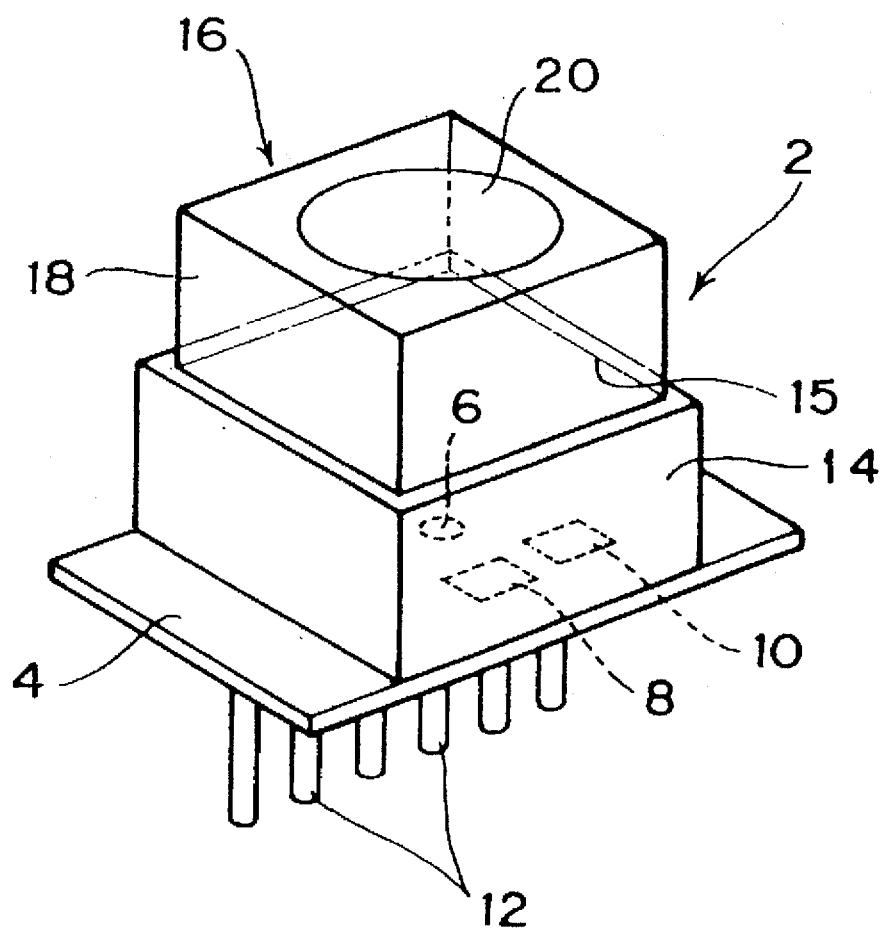
FIG. 1 is a perspective view of a hologram optical system according to a first preferred embodiment of the present invention.

Referring to FIG. 1, there is shown a perspective view of a hologram optical system 2 for an optical pickup according to a first preferred embodiment of the present invention. A laser diode 6 and photodiodes (photodetectors) 8 and 10 for FES beam detection are mounted on a stem 4 by die bonding or the like. A resin cap 14 having an upper opening 15 is fixed on the stem 4 by adhesive or the like. A hologram unit 16 adjusted to form a predetermined positional relationship with the laser diode 6 and the photodiodes 8 and 10 is bonded on the resin cap 14. The hologram unit 16 is composed of a glass substrate 18 and a hologram 20 formed on the glass substrate 18. Reference numerals 12 denote terminals of the laser diode 6 and the photodiodes 8 and 10.

Figure 2:
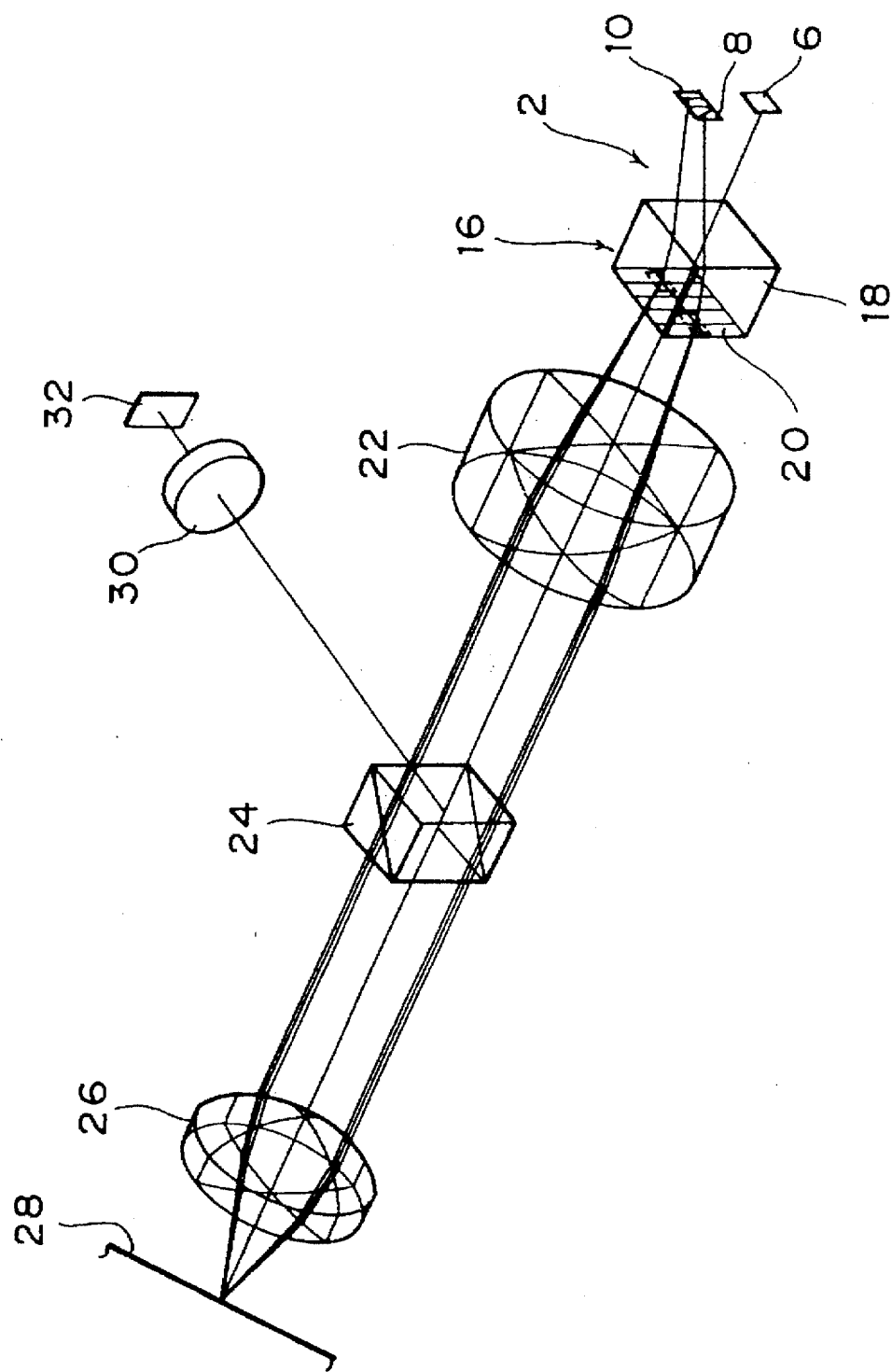
FIG. 2 is a perspective view showing the general configuration of an optical pickup adopting the hologram optical system of the present invention.

Referring to FIG. 2, there is shown a perspective view of the general configuration of an optical pickup to which the hologram optical system of the present invention is applied. A laser beam emitted from the laser diode 6 is transmitted through the glass substrate 18 and the hologram 20 of the hologram unit 16, and is collimated by a collimator lens 22. The collimated beam from the collimator lens 22 is transmitted through a beam splitter 24, and is focused on an optical disk 28 by an objective lens 26.

Reflected light from the optical disk 28 is collimated by the objective lens 26, and is split into a signal beam and a servo detection beam by the beam splitter 24. The signal beam is focused on a photodiode 32 by a lens 30, and is converted into an electrical signal by the photodiode 32, thus reading out data recorded on the optical disk 28.

The servo detection beam is transmitted through the collimator lens 22, and is divided into four first-order diffracted beams by the hologram 20. That is, the servo detection beam is divided into two beams for focusing error detection and two beams for tracking error detection. In this preferred embodiment, a Foucault method (double knife edge method) is used for focusing error detection. In the Foucault method, one photodetector for focusing error detection is prepared for one beam, so that the two photodetectors 8 and 10 are used for the two beams for focusing error detection in this preferred embodiment.

When the laser beam is focused on the optical disk, each focusing error detection beam is converged onto a dividing line of each of the photodetectors 8 and 10, and the outputs from two regions divided by the dividing line become equal to each other. When the laser beam is defocused on the optical disk, each focusing error detection beam becomes a defocused condition, and the outputs from the two divided regions become unbalanced according to an amount of defocusing, thus detecting the defocused condition of the laser beam on the optical disk.

However, in assembling the hologram optical system, there is a possibility that the focusing error detection beam may not be imaged or converged on the dividing line of the photodetector because of manufacture errors of optical elements in spite of the fact that the laser beam is focused on the optical disk, but may be imaged on a position offset from the dividing line. This invites improper detection of focusing of the beam on the optical disk by a servo system.

To avoid such improper detection of beam focusing, this preferred embodiment is configured so that the shift of a beam imaging position due to manufacture errors of optical elements is corrected by moving the hologram, and the hologram unit 16 is thereafter bonded to the resin cap 14 as shown in FIG. 1. That is, the hologram is moved so that when the laser beam is in the focused condition on the optical disk, the focusing error detection beam is imaged on the dividing line of the photodetector. In order to achieve proper adjustment of the focus error detection beam, it is necessary to move the hologram in at least two of movement in an X-direction, movement in a Y-direction, and rotational movement of the hologram.

In correcting the beam imaging position by the movement of the hologram, it is necessary to change an emergent angle of first-order diffracted light from the hologram by the movement of the hologram and optimize the change in the emergent angle for location of the beam imaging position on the dividing line of the photodetector. While the change in the emergent angle is effected by controlling the distribution of interference fringes on the hologram, the angle of inclination of the dividing line of the photodetector is a parameter for obtaining optimum distribution control of the interference fringes.

Figure 3:
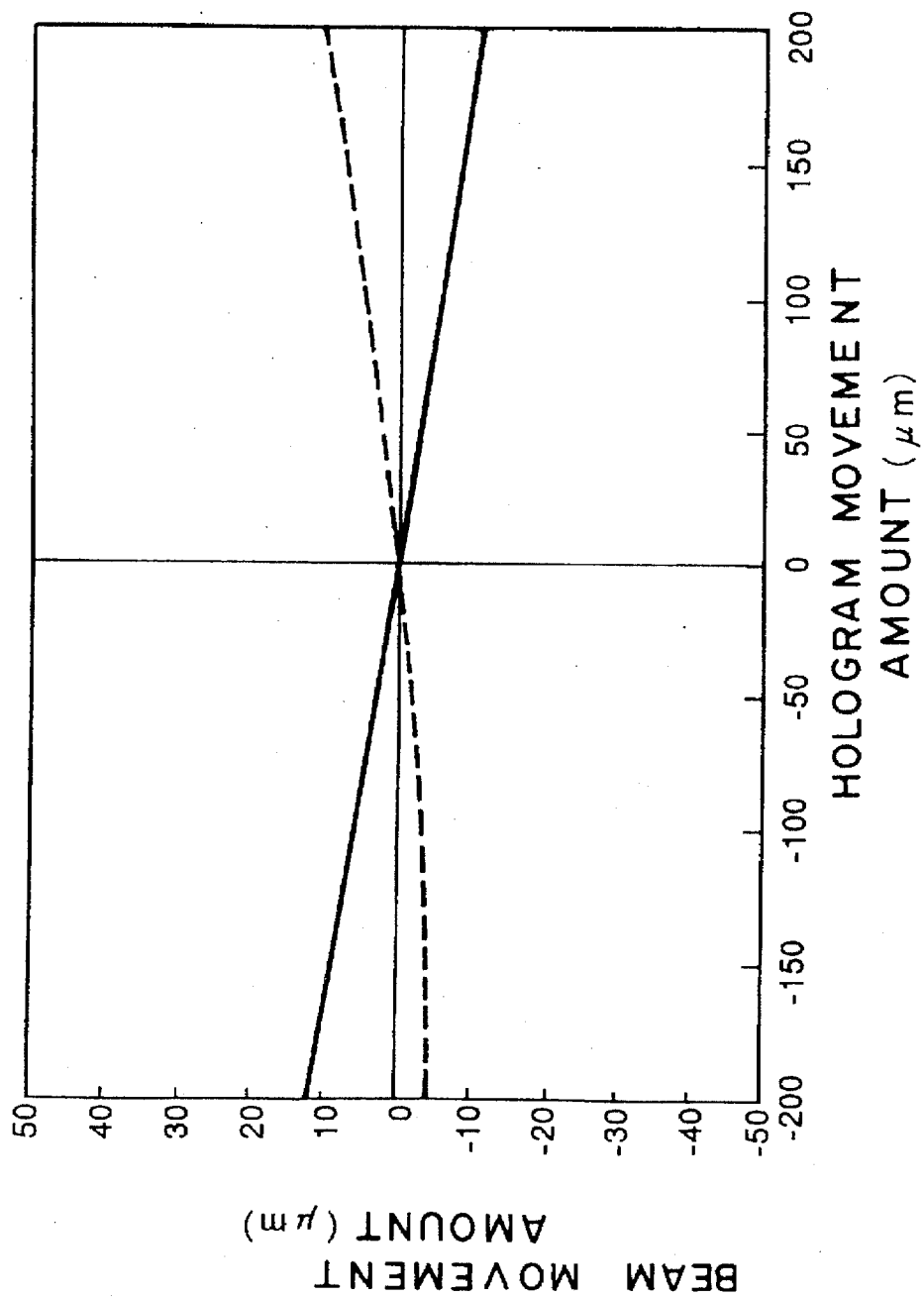
FIG. 3 is a graph showing an amount of movement of a beam imaging position when a hologram is moved in an X-direction.
Figure 4:
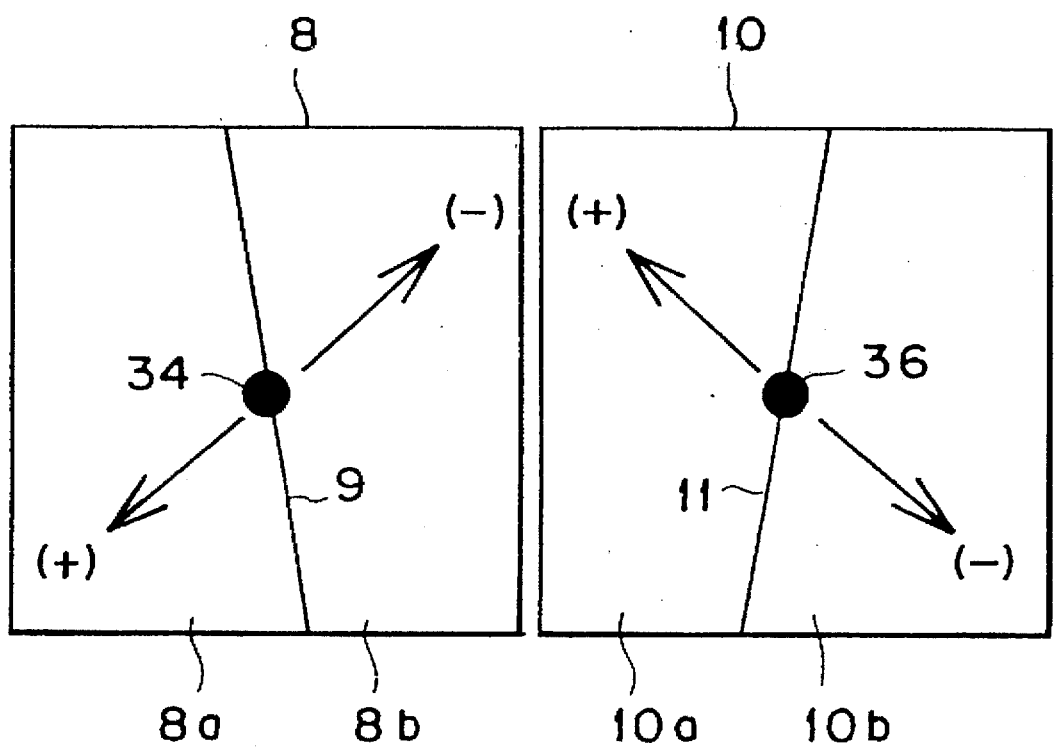
FIG. 4 is a view showing a state of movement of beam imaging positions on photodetectors when the hologram is moved in the X-direction.

FIG. 3 shows an amount of movement of a beam imaging position on the photodiode 10 when the hologram 20 is moved in the X-direction which is parallel to the track direction of the optical disk 28. In FIG. 3, the solid line shows an X-component of the beam movement amount, and the broken line shows a Y-component of the beam movement amount. FIG. 4 shows a state of movement of beam imaging positions on the photodiodes 8 and 10 when the hologram 20 is moved in the X-direction. The photodiode 8 is divided into a first region 8a and a second region 8b by a dividing line 9. Signs (+) and (−) denote directions of movement of a beam spot when the hologram is moved in positive and negative directions, respectively.

Similarly, the photodiode 10 is divided into a first region 10a and a second region 10b by a dividing line 11. The dividing line 9 of the photodiode 8 and the dividing line 11 of the photodiode 10 are symmetrical with each other with respect to a Y-axis. When the hologram is linearly moved in the positive X-direction, a beam spot 34 on the photodiode 8 is moved in the left lower direction, and a beam spot 36 on the photodiode 10 is moved in the left upper direction.

On the other hand, when the hologram is linearly moved in the negative X-direction, the beam spot 34 on the photodiode 8 is moved in the right upper direction, and the beam spot 36 on the photodiode 10 is moved in the right lower direction. In the photodiode 8, the leftward shift of the beam spot 34 from the dividing line 9 indicates that a focus is shallow with respect to the optical disk, whereas the rightward shift of the beam spot 34 from the dividing line 9 indicates that a focus is deep with respect to the optical disk.

On the other hand, in the photodiode 10, the leftward shift of the beam spot 36 from the dividing line 11 indicates that a focus is deep with respect to the optical disk, whereas the rightward shift of the beam spot 36 from the dividing line 11 indicates that a focus is shallow with respect to the optical disk. Accordingly, the hologram is moved to make the beam imaging positions on the two photodiodes 8 and 10 lie on the dividing lines 9 and 11, thereby correcting the shifts of the beam imaging positions due to manufacture errors of optical elements.

Figure 5:
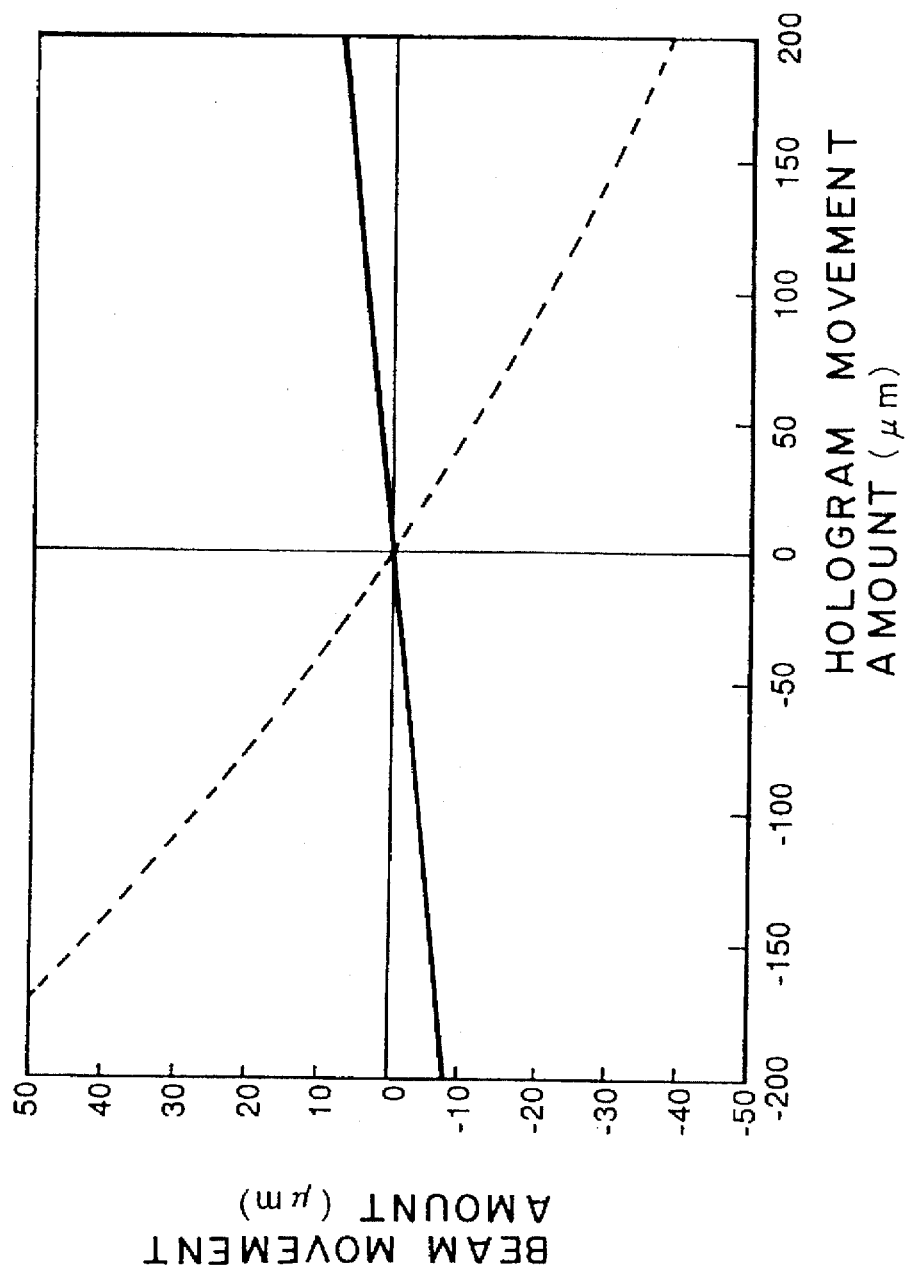
FIG. 5 is a graph showing an amount of movement of the beam imaging position when the hologram is moved in a Y-direction.
Figure 6:
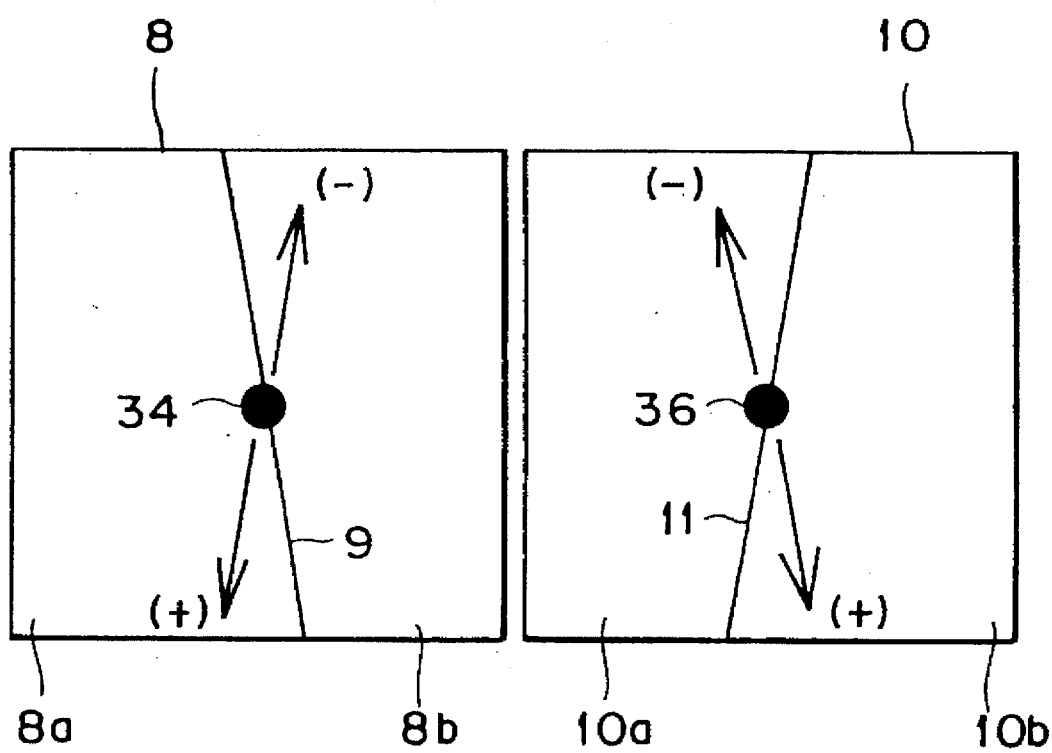
FIG. 6 is a view showing a state of movement of the beam imaging positions on the photodetectors when the hologram is moved in the Y-direction.

FIG. 5 shows an amount of movement of a beam imaging position on the photodiode 10 when the hologram 20 is moved in the Y-direction perpendicular to the X-direction. In FIG. 5, the solid line shows an X-component of the beam movement amount, and the broken line shows a Y-component of the beam movement amount. FIG. 6 shows a state of movement of beam imaging positions on the photodiodes 8 and 10 when the hologram 20 is moved in the Y-direction. When the hologram is linearly moved in the positive Y-direction, the beam spot 34 on the photodiode 8 is moved in the left lower direction, and the beam spot 36 on the photodiode 10 is moved in the right lower direction. On the other hand, when the hologram is linearly moved in the negative Y-direction, the beam spot 34 on the photodiode 8 is moved in the right upper direction, and the beam spot 36 on the photodiode 10 is moved in the left upper direction.

Figure 7:
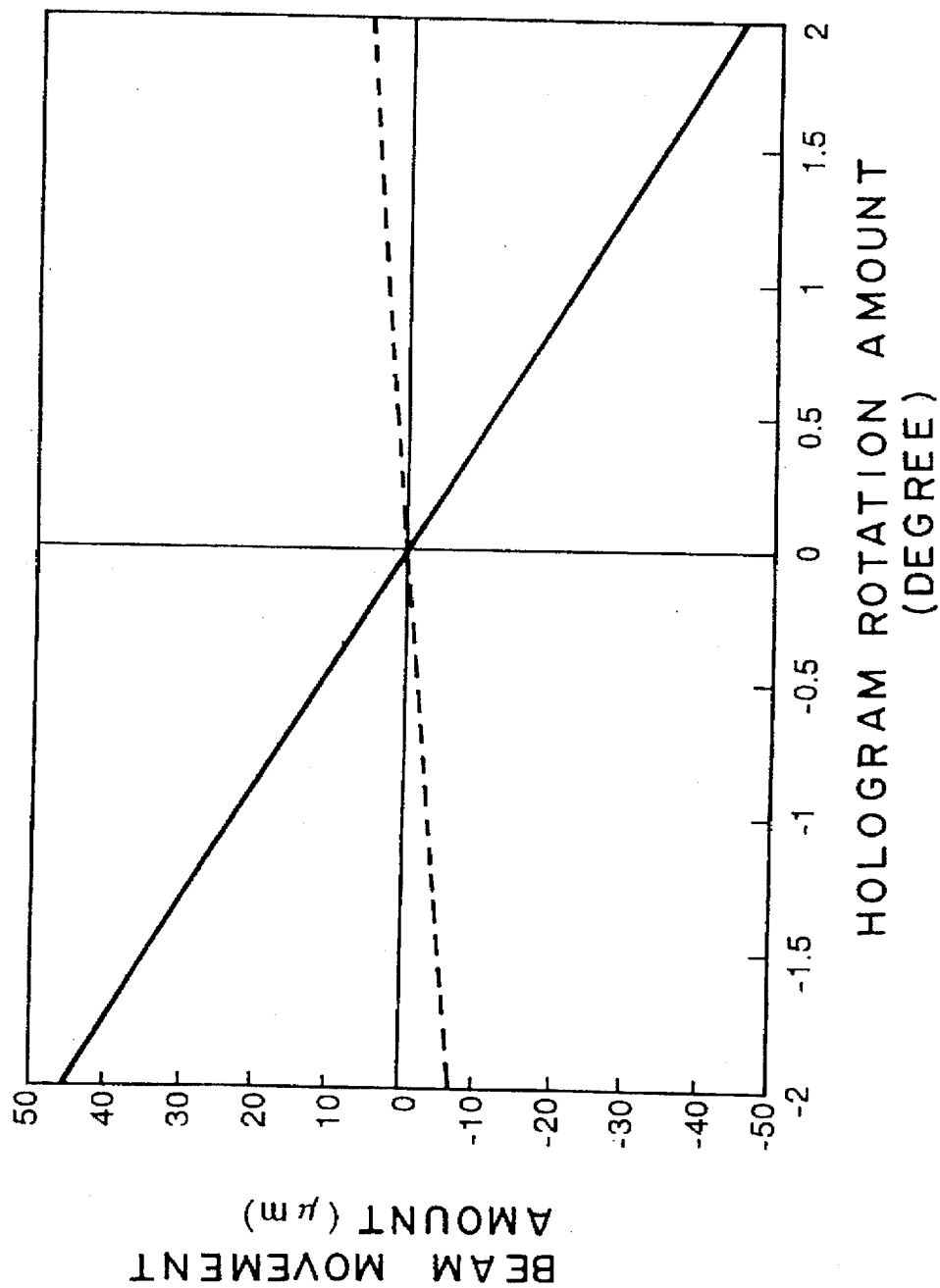
FIG. 7 is a graph showing an amount of movement of the beam imaging position when the hologram is rotated.
Figure 8:
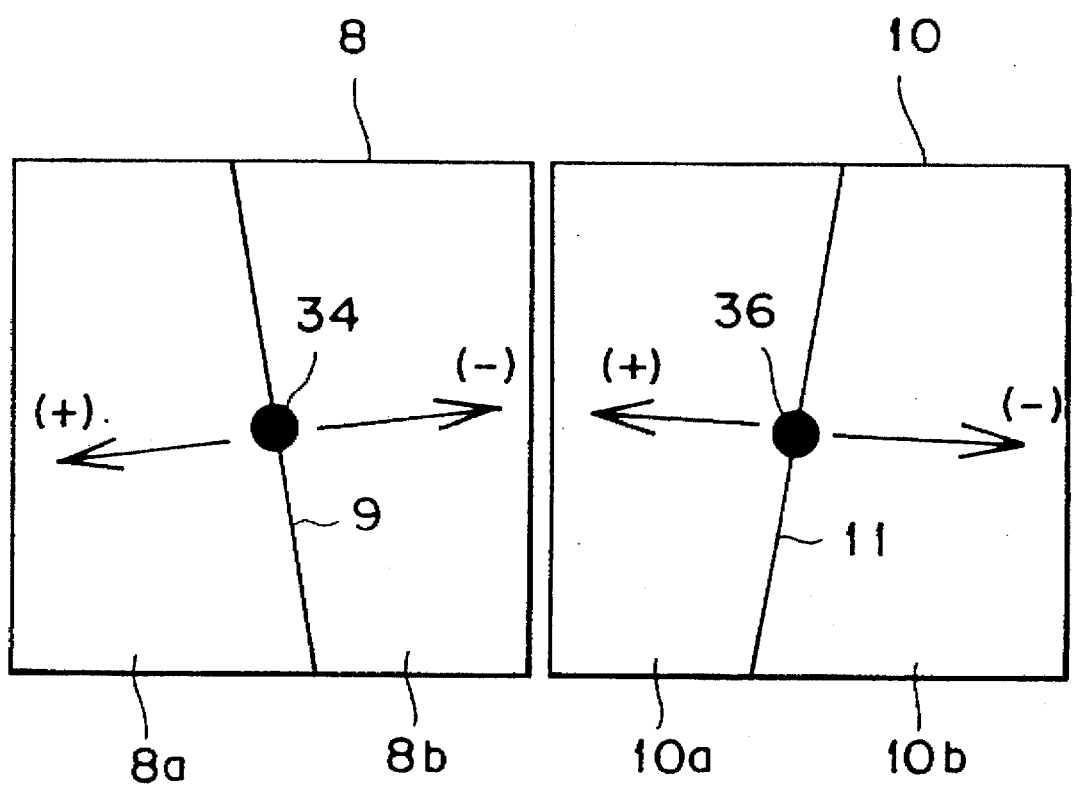
FIG. 8 is a view showing a state of movement of the beam imaging positions on the photodetectors when the hologram is rotated.

FIG. 7 shows an amount of movement of a beam imaging position on the photodiode 10 when the hologram is rotated. In FIG. 7, the solid line shows an X-component of the beam movement amount, and the broken line shows a Y-component of the beam movement amount. FIG. 8 shows a state of movement of beam imaging positions on the photodiodes 8 and 10 when the hologram is rotated. When the hologram is rotated clockwise, the beam spot 34 on the photodiode 8 is moved leftward, and the beam spot 36 is also moved leftward. On the other hand, when the hologram is rotated counterclockwise, the beam spot 34 on the photodiode 8 is moved rightward, and the beam spot 36 on the photodiode 10 is also moved rightward.

Figure 9:
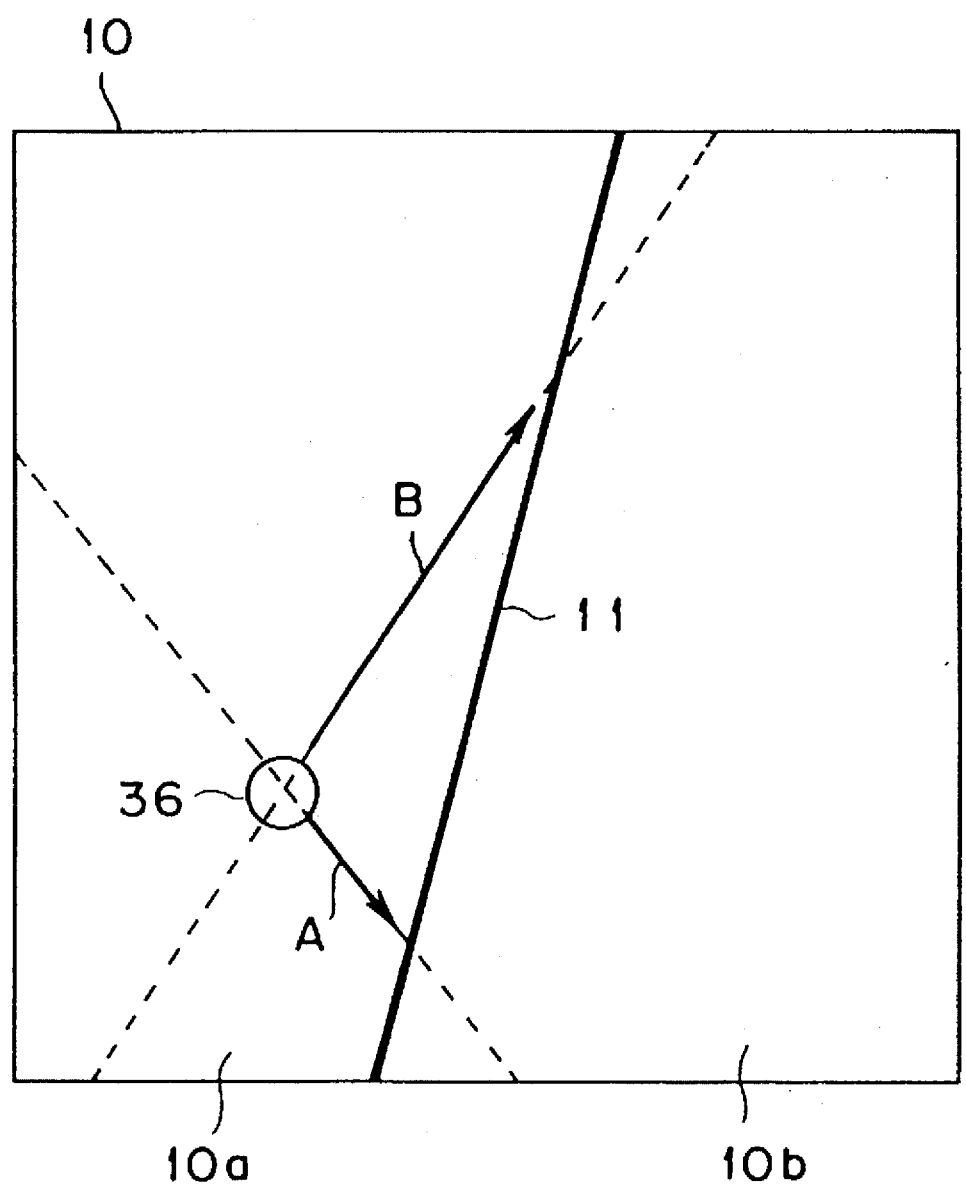
FIG. 9 is a view showing the relation between beam movement direction and dividing line direction in adjusting an FES beam imaging position.

The movement of a beam imaging position on the photodiode is related with the distribution of interference fringes or the distribution of spatial frequencies on the hologram. Referring to FIG. 9, there is shown the relation between direction of beam movement and direction of the dividing line 11 in adjusting a beam imaging position. The dividing line 11 has a positive gradient. As apparent from FIG. 9, when the dividing line 11 has a positive gradient, the amount of movement of the beam spot 36 to the dividing line 11 in a direction A is smaller than that in a direction B, so that the amount of movement of the hologram for effecting the movement of the beam spot 36 in the direction A is smaller than that for effecting the movement of the beam spot 36 in the direction B. This indicates that the amount of movement of the hologram can be made smaller in the case where the gradient of the dividing line 11 is opposite in sign to the gradient of a movement vector of the beam spot than in the case where the former is the same in sign as the latter, and that the smaller amount of movement of the hologram is advantageous for the adjustment of the beam spot.

The relation between the adjustment of the beam spot and the interference fringes on the hologram will now be described. When the gradient of the dividing line is positive, it is preferable to make negative the gradient of a movement vector of the FES beam spot on the photodiode in moving the hologram in the X-direction and the Y-direction. The negative gradient of the movement vector indicates that the FES beam spot is adjusted to increase in value in the X-direction and decrease in value in the Y-direction, or that the FES beam spot is adjusted to decrease in value in the X-direction and increase in value in the Y-direction.

This can be expressed by using spatial frequencies of interference fringes on the hologram as follows:

A diffraction angle $\theta_d$ for a minute movement $\Delta x$ of the hologram in the X-direction is given by the following relation of incidence and emergence on a diffraction grating.

$$\sin\theta_d = \sin\theta_i + \lambda f_x$$

where $\theta_i$ is an incidence angle, $\lambda$ is a wavelength, and $f_x$ is an X-component of spatial frequency.

Accordingly, the following equation holds.

$$\Delta\theta_d = \frac{\frac{\partial f_x}{\partial x} \Delta x \lambda}{\cos\theta_d}$$

When $\delta f_x/\delta x$ is positive for the minute movement $\Delta x$, the direction of movement of the beam spot becomes positive, whereas when $\delta f_x/\delta x$ is negative for the minute movement $\Delta x$, the direction of movement of the beam spot becomes negative. However, the fact that the beam spot increases in value with an increase in the diffraction angle $\theta_d$ is used.

Accordingly, it is necessary to make negative the product of an X-directional change rate of an X-component of a spatial frequency or an interference fringe pitch and an X-directional change rate of a Y-component of the spatial frequency or the interference fringe pitch, and to make negative the product of a Y-directional change rate of the X-component and a Y-directional change rate of the Y-component. This will be expressed by using a transfer function $\phi(x, y)$ of interference fringes.

The X-component ($f_x$) and the Y-component ($f_y$) of a spatial frequency are respectively given as follows:

$$\frac{\delta \phi(x, y)}{\delta x} ; \frac{\delta \phi(x, y)}{\delta y}$$

The X-directional change rates of the X-component and the Y-component of a spatial frequency are respectively given as follows:

$$\frac{\delta^2 \phi(x, y)}{\delta x^2} ; \frac{\delta^2 \phi(x, y)}{\delta x \delta y}$$

The Y-directional change rates of the X-component and the Y-component of a spatial frequency are respectively given as follows:

$$\frac{\delta^2 \phi(x, y)}{\delta x \delta y} ; \frac{\delta^2 \phi(x, y)}{\delta y^2}$$

Accordingly, the conditions for making negative the product of the X-directional change rate of the X-component and the X-directional change rate of the Y-component of a spatial frequency, and for making negative the product of the Y-directional change rate of the X-component and the Y-directional change rate of the Y-component of a spatial frequency are expressed as follows:

$$\frac{\delta^2\phi(x,y)}{\delta x^2} \times \frac{\delta^2\phi(x,y)}{\delta x\,\delta y} < 0 \quad (1)$$

$$\frac{\delta^2\phi(x,y)}{\delta x\,\delta y} \times \frac{\delta^2\phi(x,y)}{\delta y^2} < 0 \quad (2)$$

In general, a phase transfer function $\phi(x, y)$ is expressed in the form of power series of x and y as follows:

$$\phi(x,y)=(2\pi/\lambda)\times(c_1x+c_2y+c_3x^2+c_4xy+c_5y^2+c_6x^3+c_7x^2y+c_8xy^2+c_9y^3+\ldots)$$

Since values in the vicinity of an origin in a quadratic differential of this function are zero in four and more degrees, the function $\phi(x, y)$ can be expressed as follows:

$$\phi(x,y)=(2\pi/\lambda)*(c_1x+c_2y+c_3x^2+c_4xy+c_5y^2)$$

This is inserted into the conditions (1) and (2) to give $$c_3c_4<0 \text{ and } c_4c_5<0.$$

Similarly, when the gradient of the dividing line is negative, it is preferable to make positive the gradient of the movement vector of the FES beam spot in rotating the hologram and in moving the hologram in the Y-direction. The positive gradient of the movement vector indicates that the FES beam spot is adjusted to increase in value in the X-direction and decrease in value in the Y-direction, or that the FES beam spot is adjusted to decrease in value in the X-direction and decrease in value in the Y-direction.

In this case, the conditions are expressed as follows:

$$\frac{\delta^2\phi(x,y)}{\delta x^2} \times \frac{\delta^2\phi(x,y)}{\delta x\,\delta y} > 0 \quad (3)$$

$$\frac{\delta^2\phi(x,y)}{\delta y\,\delta x} \times \frac{\delta^2\phi(x,y)}{\delta y^2} > 0 \quad (4)$$

The above-mentioned calculation is applied to these conditions to result in $$c_3c_4>0 \text{ and } c_4c_5>0.$$

In summary, the conditions for interference fringes on the hologram suitable for adjustment of the beam spot are as follows:

When the gradient of the dividing line is positive, the coefficients $c_3$ and $c_5$ in the phase transfer function are to have the same sign, and the coefficients $c_3$ and $c_4$ are to have different signs. These conditions include the following states.

(1) The pitch of interference fringes on the hologram changes so that the X-component changes from a non-dense value to a dense value in the positive X-direction, and that the Y-component changes from a dense value to a non-dense value in the positive X-direction.

(2) The pitch of interference fringes on the hologram changes so that the X-component changes from a dense value to a non-dense value in the positive X-direction, and that the Y-component changes from a nondense value to a dense value in the positive X-direction.

(3) The pitch of interference fringes on the hologram changes so that the X-component changes from a non-dense value to a dense value in the positive Y-direction, and that the Y-component changes from a dense value to a non-dense value in the positive Y-direction.

(4) The pitch of interference fringes on the hologram changes so that the X-component changes from a dense value to a non-dense value in the positive Y-direction, and that the Y-component changes from a nondense value to a dense value in the positive Y-direction.

On the other hand, when the gradient of the dividing line is negative, the coefficients $c_3$, $c_4$, and $c_5$ in the phase transfer function are to have the same sign. These conditions include the following states.

(1) The pitch of interference fringes on the hologram changes so that both the X-component and the Y-component change from a non-dense value to a dense value in the positive X-direction.

(2) The pitch of interference fringes on the hologram changes so that both the X-component and the Y-component change from a dense value to a non-dense value in the positive X-direction.

(3) The pitch of interference fringes on the hologram changes so that both the X-component and the Y-component change from a non-dense value to a dense value in the positive Y-direction.

(4) The pitch of interference fringes on the hologram changes so that both the X-component and the Y-component change from a dense value to a non-dense value in the positive Y-direction.

Further, in the case that the rotation of the hologram is used for adjustment of the FES beam spot, the following conditions are given like Eqs. (1), (2), (3), and (4) mentioned above.

$$\frac{\delta^2\phi(x,y)}{\delta\theta\,\delta x} \times \frac{\delta^2\phi(x,y)}{\delta\theta\,\delta y} < 0 \quad (5)$$

or $$\frac{\delta^2\phi(x,y)}{\delta\theta\,\delta x} \times \frac{\delta^2\phi(x,y)}{\delta\theta\,\delta y} > 0 \quad (6)$$

Figure 10:
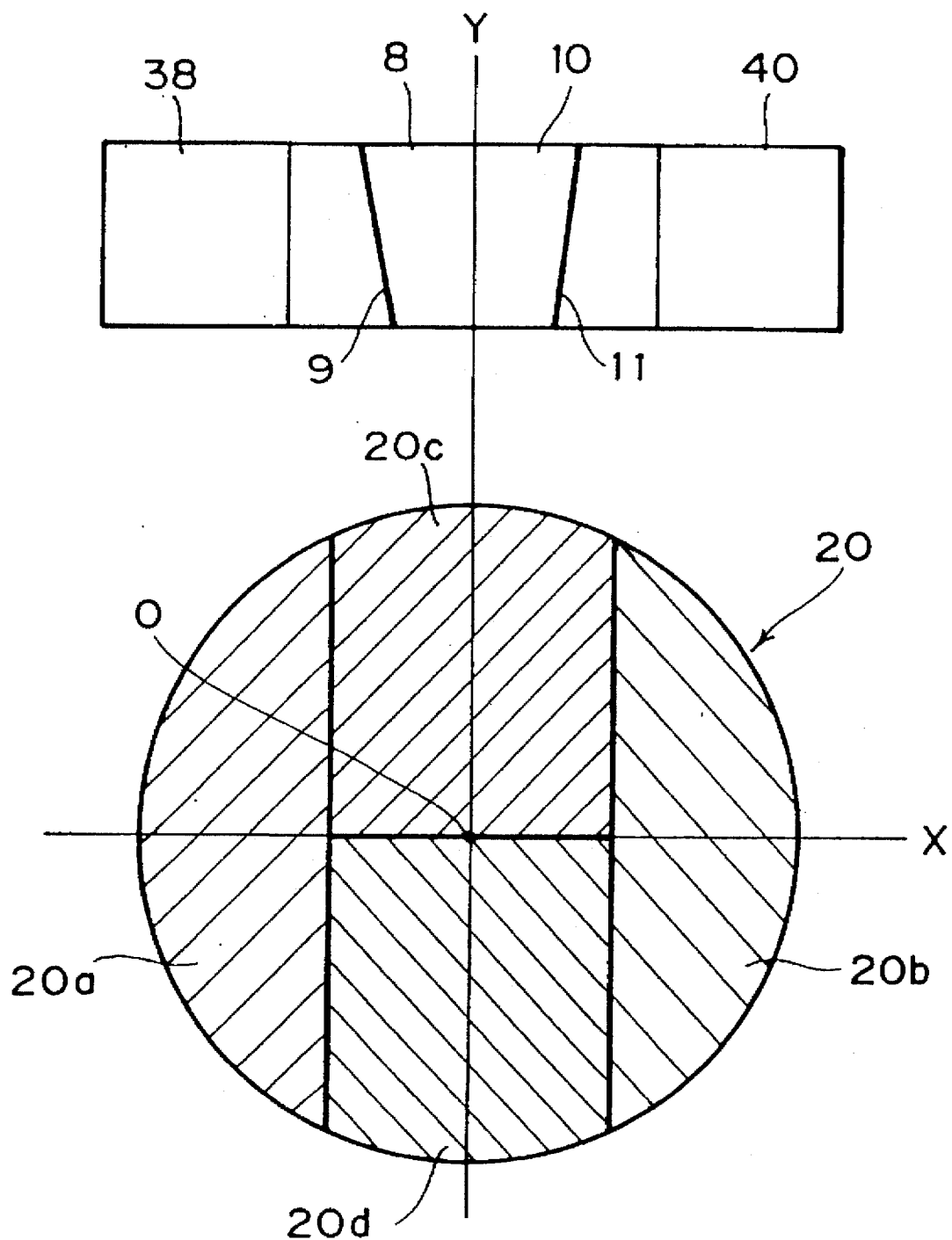
FIG. 10 is a view showing the relation between distribution of interference fringes on a hologram and a photodetector.

FIG. 10 shows the relation between interference fringe distribution on the hologram 20 and photodiodes 8, 10, 38, and 40 when the hologram 20 is projected on the same plane as that of the photodiodes 8, 10, 38, and 40. The hologram 20 is divided into four regions 20a, 20b, 20c, and 20d, and there are formed independent interference fringes in the four regions 20a to 20d. The photodiodes 8 and 10 are those for FES beam detection, and the photodiodes 38 and 40 are those for tracking error signal (TES) beam detection.

As previously mentioned, the dividing line 9 of the photodiode 8 and the dividing line 11 of the photodiode 10 are symmetrical with each other with respect to the Y-axis. Extensions of the dividing lines 9 and 11 intersect an optical axis of the optical system passing the center o of the hologram 20. An FES beam diffracted by the region 20a of the hologram 20 is focused on the photodiode 8, and an FES beam diffracted by the region 20b of the hologram 20 is focused on the photodiode 10. On the other hand, a TES beam diffracted by the region 20c of the hologram 20 is focused on the photodiode 38, and a TES beam diffracted by the region 20d of the hologram 20 is focused on the photodiode 40.

Figure 11:
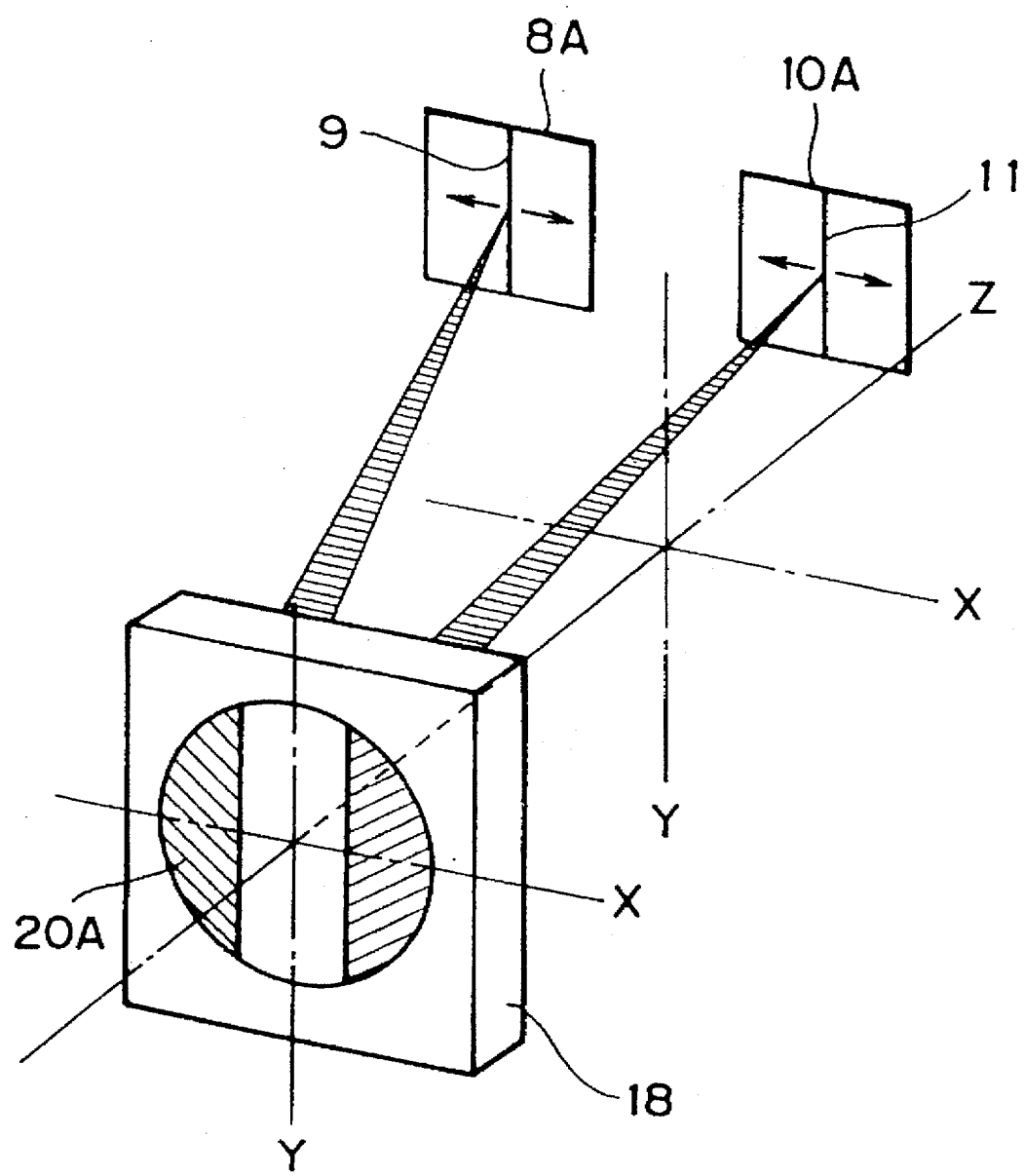
FIG. 11 is a perspective view of a second preferred embodiment of the present invention.

Referring to FIG. 11, there is shown a perspective view of a second preferred embodiment of the present invention. A pair of photodiodes 8A and 10A for FES beam detection respectively have dividing lines 9 and 11 both parallel to a Y-axis. A hologram 20A formed on a glass substrate 18 has a distribution of interference fringes such that beam spots on the photodiodes 8A and 10A are moved substantially along an X-axis. That is, the distribution of the interference fringes on the hologram 20A is such that the Y-component of the pitch of the interference fringes is substantially constant in the X-direction or in the Y-direction.

Figure 12:
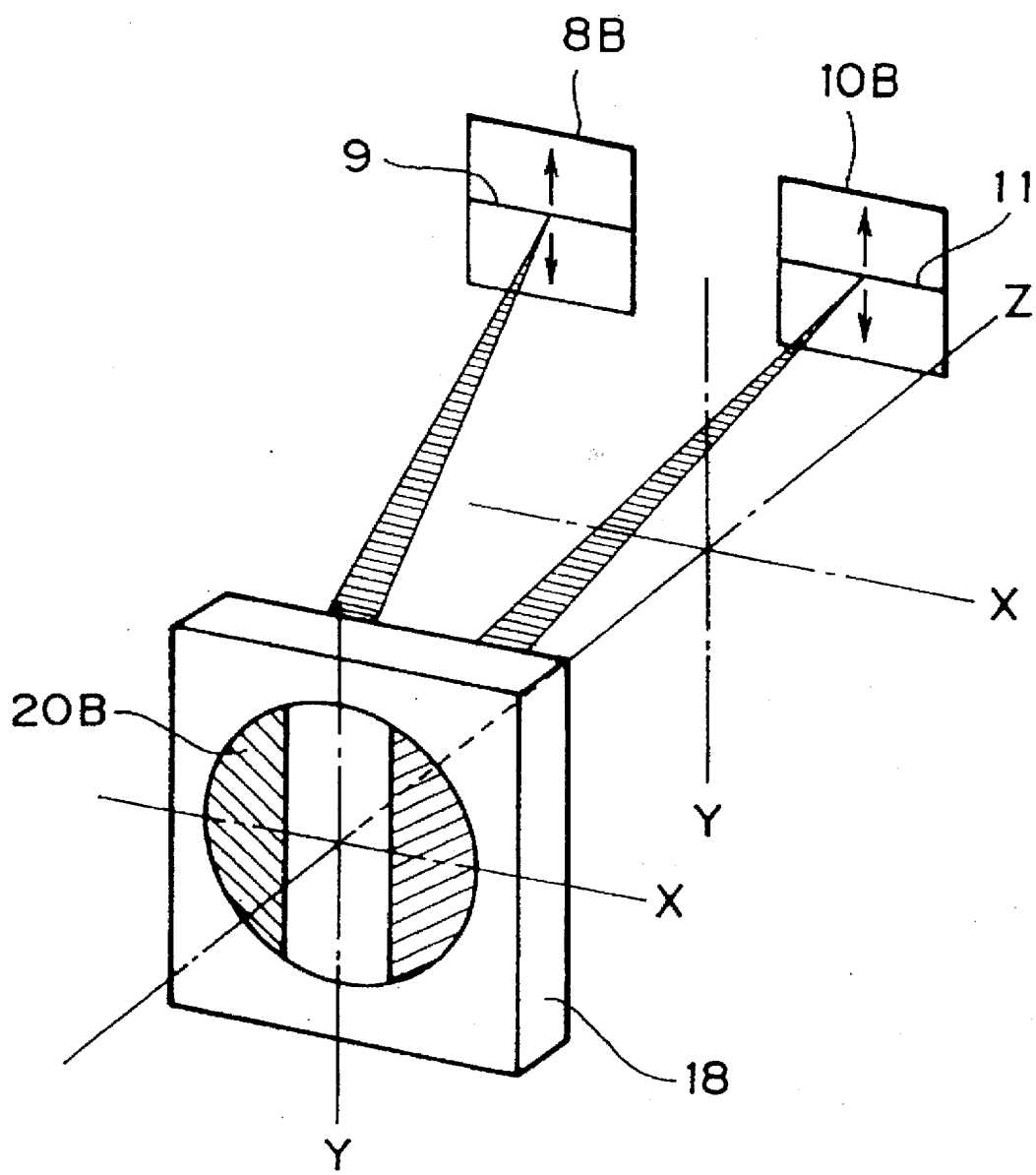
FIG. 12 is a perspective view of a third preferred embodiment of the present invention.

Referring to FIG. 12, there is shown a perspective view of a third preferred embodiment of the present invention. In this preferred embodiment, a pair of photodiodes 8B and 10B for FES beam detection respectively have dividing lines 9 and 11 both parallel to an X-axis. A hologram 20B formed on a glass substrate 18 has a distribution of interference fringes such that beam spots on the photodiodes 8B and 10B are moved substantially along a Y-axis. That is, the distribution of the interference fringes on the hologram 20B is such that the X-component of the pitch of the interference fringes is substantially constant in the X-direction or in the Y-direction.

Figure 13:
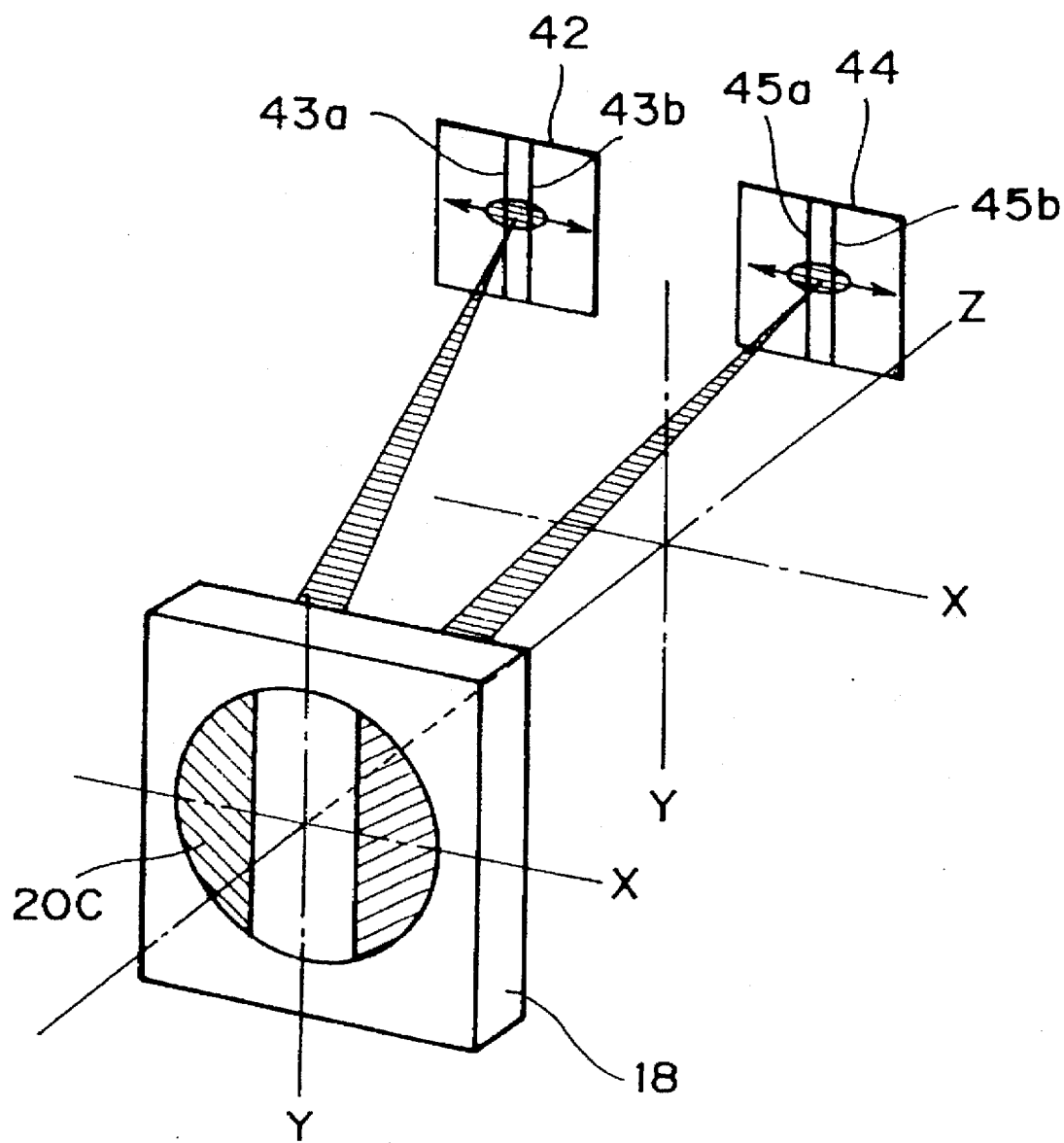
FIG. 13 is a perspective view of a fourth preferred embodiment of the present invention.

Referring to FIG. 13, there is shown a perspective view of a fourth preferred embodiment of the present invention. In this preferred embodiment, a photodiode 42 is divided into three regions by two dividing lines 43a and 43b, and a photodiode 44 is also divided into three regions by two dividing lines 45a and 45b. A hologram 20C having a given distribution of interference fringes is formed on a glass substrate 18. Also in such a configuration that one photodetector is divided into three regions, the distribution of interference fringes on the hologram optimizing the movement of FES beams in adjustment of FES beam imaging positions according to the present invention is effective. In this case, a spot size detection (SSD) method different from the above-mentioned Foucault method is used as a detection method.

The SSD method will now be schematically described with reference to FIGS. 14 to 16C. The SSD method is a method of detecting an amount of defocusing of a laser beam on an optical disk from a change in spot size of a beam shaped for FES detection. A beam reflected on an optical disk is transmitted through a lens 46. A part of the beam from the lens 46 is transmitted through a semitransparent mirror 48, and then converged onto a first photodetector 50. The remaining part of the beam from the lens 46 is reflected on the semitransparent mirror 48, and then converted onto a second photodetector 52.

Figure 14:
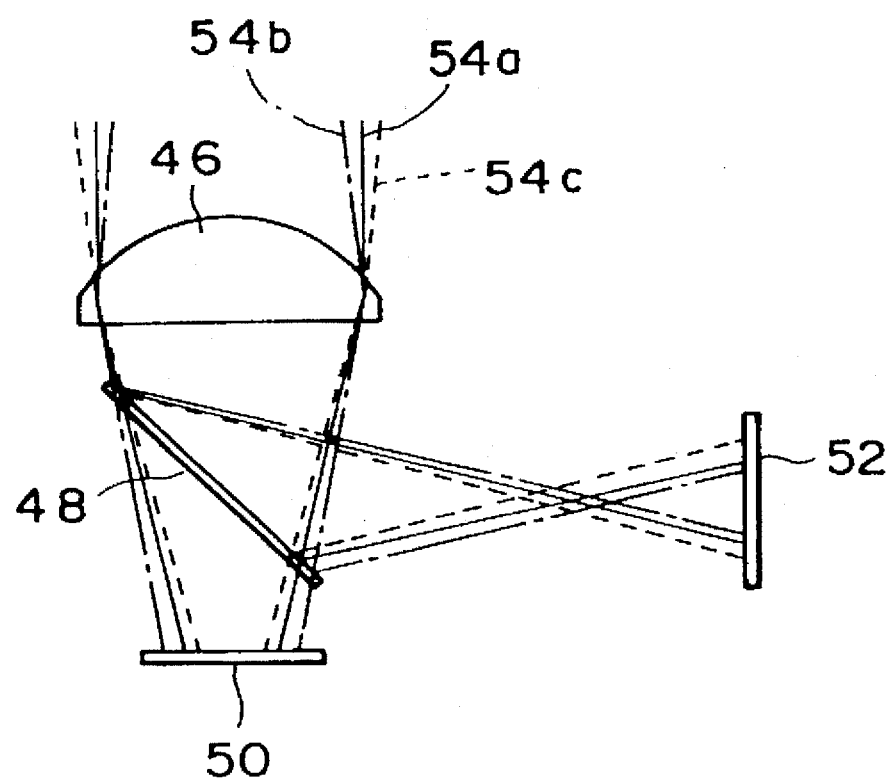
FIG. 14 is a view illustrating an SSD (spot size detection) method.
Figure 15A:
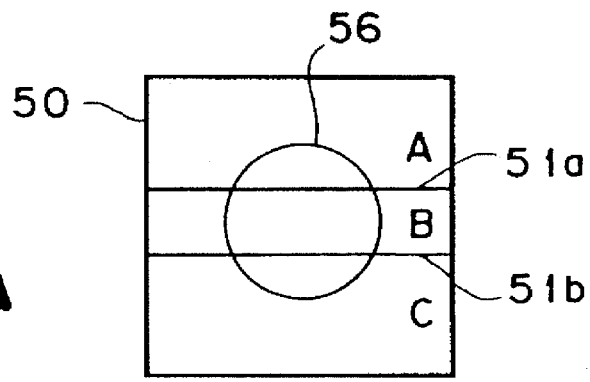
FIGS. 15A, 15B, and 15C are views illustrating a first photodetector.
Figure 15B:
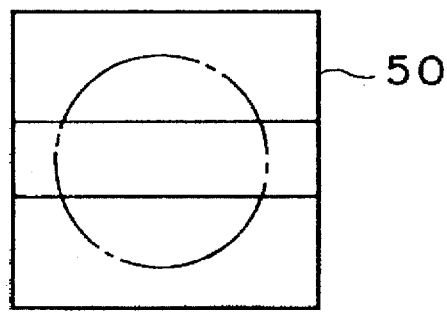
Figure 15C:
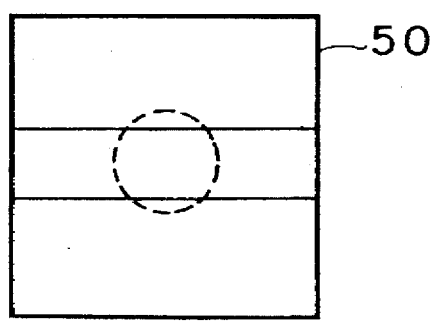
Figure 16C:
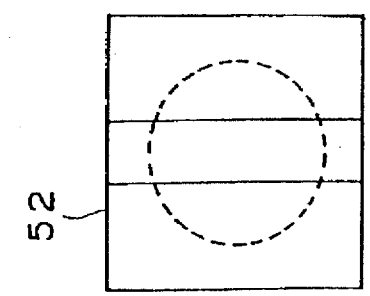
FIGS. 16A, 16B, and 16C are views illustrating a second photodetector.
Figure 16B:
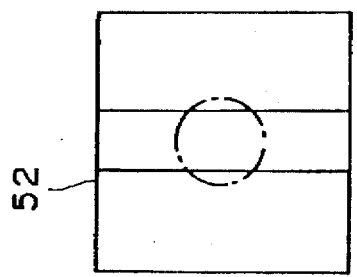
Figure 16A:
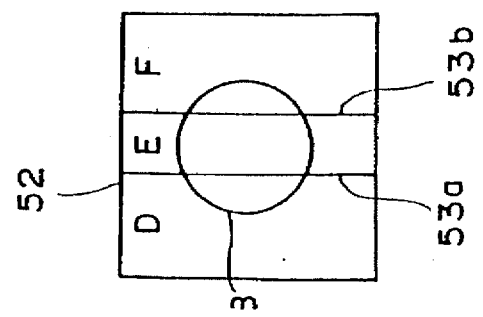

As shown in FIGS. 15A to 15C, the first photodetector 50 is divided into three regions A, B, and C by two dividing lines 51a and 51b. Similarly, as shown in FIGS. 16A to 16C, the second photodetector 52 is divided into three regions D, E, and F by two dividing lines 53a and 53b. In the case of a beam 54a shown in FIG. 14, a beam spot 56 having a given size is formed on the first photodetector 50 as shown in FIG. 15A, and a beam spot 58 having a given size is formed on the second photodetector 52 as shown in FIG. 16A. In this case, the laser beam is focused on the optical disk.

In the case that the focus of the laser beam is present before the optical disk, the beam reflected on the optical disk becomes a beam 54b shown in FIG. 14. In this case, a beam spot as shown in FIG. 15B is formed on the first photodetector 50, and a beam spot as shown in FIG. 16B is formed on the second photodetector 52. In contrast, when the focus of the laser beam is present behind the optical disk, the beam reflected on the optical disk becomes a beam 54c shown in FIG. 14. In this case, a beam spot as shown in FIG. 15C is formed on the first photodetector 50, and a beam spot as shown in FIG. 16C is formed on the second photodetector 52.

Accordingly, FES signal outputs $FES_{SSD1}$ and $FES_{SSD2}$ from the first and second photodetectors 50 and 52 are expressed as follows:

$$FES_{SSD1} = (A+C) - B$$

$$FES_{SSD2} = (D+F) - E$$

Accordingly, a difference $FES_{C-SSD}$ between the FES signal outputs from the two photodetectors 50 and 52 is given as follows:

$$\begin{aligned} FES_{C-SSD} &= FES_{SSD1} - FES_{SSD2} \\ &= [(A+C)-B] - [(D+F)-E] \\ &= (A+C+E) - (B+D+F) \end{aligned}$$

When the focus of the laser beam is present on the optical disk, the relation of $FES_{C-SSD}=0$ holds. When the focus of the laser beam is present before the optical disk, the relation of $FES_{C-SSD}>0$ holds. When the focus of the laser beam is present behind the optical disk, the relation of $FES_{C-SSD}<0$ holds.

Figure 17A:
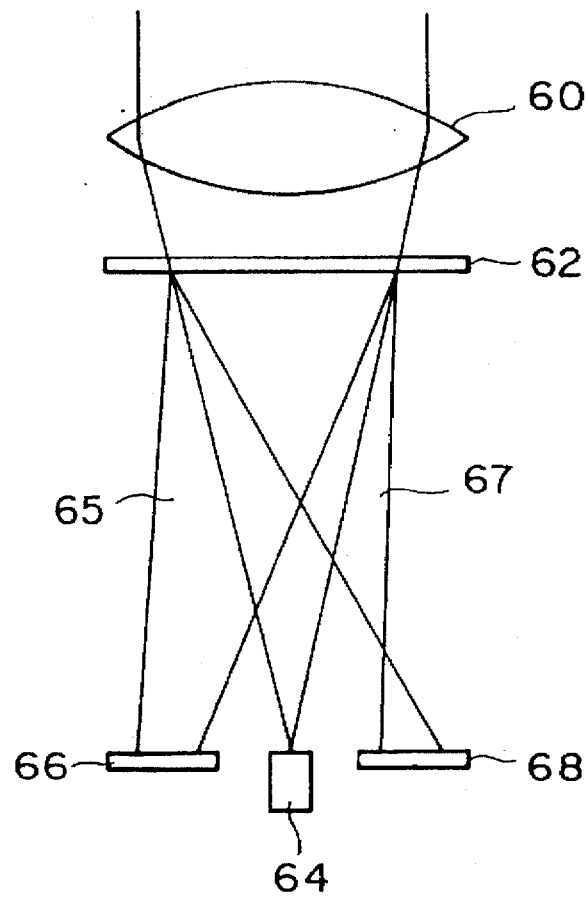
FIGS. 17A and 17B are views showing an SSD system using a hologram.
Figure 17B:
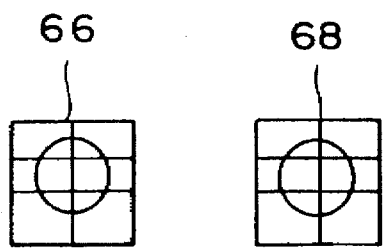

Referring to FIGS. 17A and 17B, there is schematically shown an SSD system using a hologram. As shown in FIG. 17A, a laser diode 64 is located between two photodiodes 66 and 68 for FES beam detection. As shown in FIG. 17B, each of the photodiodes 66 and 68 is divided into three regions by two dividing lines. A reflected beam from an optical disk is transmitted through a lens 60 to enter a hologram 62. A plus first-order diffracted beam from the hologram 62 is converged onto the photodiode 66, and a minus first-order diffracted beam from the hologram 62 is converged onto the photodiode 68. The spot sizes on the photodiodes 66 and 68 are detected to thereby adjust focusing of the laser beam to the optical disk.

As described above, the optical system of the present invention employs a hologram having an interference fringe distribution in given relationship with a dividing line of a photodetector. Accordingly, in manufacturing an optical pickup for an optical disk, manufacture errors of optical elements to be used can be absorbed to allow adjustment such that an FES beam imaging position on the photodetector is easily moved to lie on the dividing line.

What is claimed is:

1. A hologram optical system for an optical pickup for an optical disk drive, comprising:

a stem;

a laser diode fixed to said stem;

a focusing error detector fixed to said stem and having at least one straight dividing line for dividing said focusing error detector into a first region and a second region, said dividing line of said focusing error detector having a position gradient;

a cap mounted on said stem so as to surround said laser diode and said focusing error detector; and a hologram unit including a hologram mounted on said cap so as to form a predetermined positional relationship with said laser diode and said focusing error detector, the product of a change rate of an X-directional component of a pitch of interference fringes on said hologram and a change rate of a Y-directional component of said pitch being negative.

2. A hologram optical system for an optical pickup for an optical disk drive, comprising:

a stem;

a laser diode fixed to said stem;

a focusing error detector fixed to said stem and having at least one straight dividing line for dividing said focusing error detector into a first region and a second region, said dividing line of said focusing error detector having a negative gradient;

a cap mounted on said stem so as to surround said laser diode and said focusing error detector; and a hologram unit including a hologram mounted on said cap so as to form a predetermined positional relationship with said laser diode and said focusing error detector, the product of a change rate of an X-directional component of a pitch of interference fringes on said hologram and a change rate of a Y-directional component of said pitch being positive.

3. A hologram optical system for an optical pickup for an optical disk drive, comprising:

a stem;

a laser diode fixed to said stem;

a focusing error detector fixed to said stem and having at least one straight dividing line for dividing said focusing error detector into a first region and a second region, said dividing line of said focusing error detector having a position gradient;

a cap mounted on said stem so as to surround said laser diode and said focusing error detector; and a hologram unit including a hologram mounted on said cap so as to form a predetermined positional relationship with said laser diode and said focusing error detector;

wherein when a phase transfer function of said hologram is expressed by:

$$\phi(x,y) = (2\pi/\lambda) * (c_1 x + c_2 y + c_3 x^2 + c_4 xy + c_5 y^2 + c_6 x^3 + c_7 x^2 y + c_8 xy^2 + c y^3 + \dots)$$

where $\lambda$ is a laser wavelength, $c_3$ and $c_5$ are coefficients having the same sign, and $c_3$ and $c_4$ are coefficients having different signs.

4. A hologram optical system for an optical pickup for an optical disk drive, comprising:

a stem;

a laser diode fixed to said stem;

a focusing error detector fixed to said stem and having at least one straight dividing line for dividing said focusing error detector into a first region and a second region, said dividing line of said focusing error detector having a negative gradient;

a cap mounted on said stem so as to surround said laser diode and said focusing error detector; and a hologram unit including a hologram mounted on said cap so as to form a predetermined positional relationship with said laser diode and said focusing error detector;

wherein when a phase transfer function of said hologram is expressed by:

$$\phi(x,y) = (2\pi/\lambda) * (c_1 x + c_2 y + c_3 x^2 + c_4 xy + c_5 y^2 + c_6 x^3 + c_7 x^2 y + c_8 xy^2 + c y^3 + \dots)$$

where $\lambda$ is a laser wavelength, and $c_3$, $c_4$, and $c_5$ are coefficients having the same sign.

5. A hologram optical system for an optical pickup for an optical disk drive, comprising:

a stem;

a laser diode fixed to said stem;

a focusing error detector fixed to said stem and having at least one straight dividing line for dividing said focusing error detector into a first region and a second region, said dividing line of said focusing error detector being substantially parallel to a given axis;

a cap mounted on said stem so as to surround said laser diode and said focusing error detector; and a hologram unit including a hologram mounted on said cap so as to form a predetermined positional relationship with said laser diode and said focusing error detector, a component of a pitch of interference fringes on said hologram along said given axis being substantially constant in a direction perpendicular to said given axis.

6. A hologram optical system for an optical pickup for an optical disk drive, comprising:

a stem;

a laser diode fixed to said stem;

a focusing error detector fixed to said stem and having at least one straight dividing line for dividing said focusing error detector into a first region and a second region, said dividing line of said focusing error detector being substantially parallel to a given axis;

a cap mounted on said stem so as to surround said laser diode and said focusing error detector; and a hologram unit including a hologram mounted on said cap so as to form a predetermined positional relationship with said laser diode and said focusing error detector, a component of a pitch of interference fringes on said hologram along said given axis being substantially constant in a direction of said given axis.

* * * * *

UNITED STATES PATENT AND TRADEMARK OFFICE
CERTIFICATE OF CORRECTION

PATENT NO. : 5,696,748
DATED : Dec. 9, 1997
INVENTOR(S) : Hiroyasu Yoshikawa

It is certified that error appears in the above-identified patent and that said Letters Patent is hereby corrected as shown below:

Column 4, line 61, delete "lob" and insert --10b-- therefor.

Column 7, line 14, delete "$c_r xy$" and insert --$c_4 xy$-- therefor.

Column 7, line 21, delete "$c_r xy$" and insert --$c_4 xy$-- therefor.

Column 11, line 32, delete "$c_r xy$" and insert --$c_4 xy$-- therefor.

UNITED STATES PATENT AND TRADEMARK OFFICE
CERTIFICATE OF CORRECTION

PATENT NO. : 5,696,748
DATED : Dec. 9, 1997
INVENTOR(S) : Hiroyasu Yoshikawa

It is certified that error appears in the above-identified patent and that said Letters Patent is hereby corrected as shown below:

Column 12, line 6, delete "$c_r xy$" and insert --

$c_4 xy$-- therefor.

Signed and Sealed this

First Day of September, 1998

BRUCE LEHMAN

*Attest:*

*Attesting Officer*     Commissioner of Patents and Trademarks